June 9, 1964  J. G. MADGE  3,136,191
GLASS CUTTING HEAD
Filed Feb. 15, 1961  2 Sheets-Sheet 2
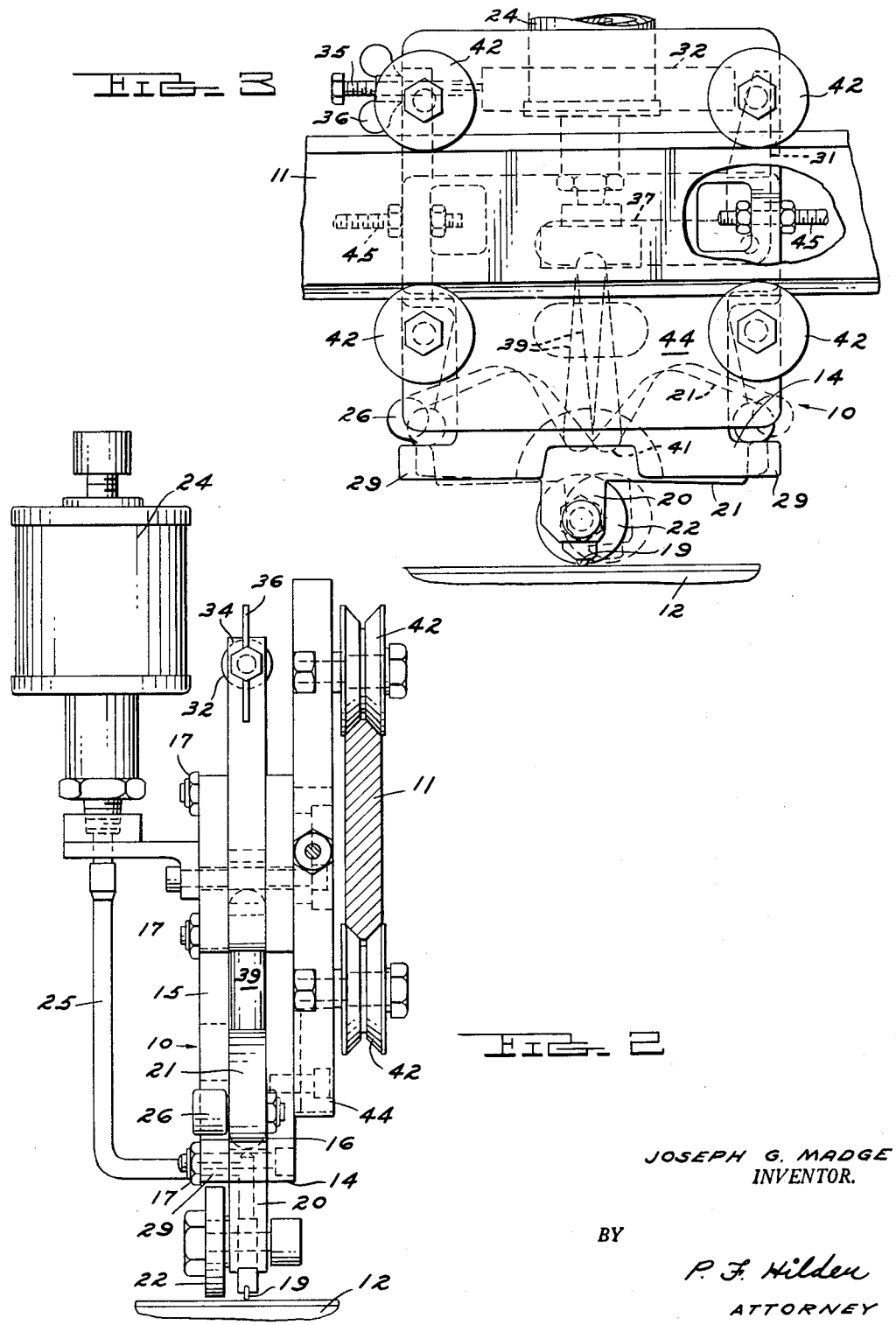
JOSEPH G. MADGE
INVENTOR.
BY
P. F. Hilden
ATTORNEY United States Patent Office 3,136,191
Patented June 9, 1964

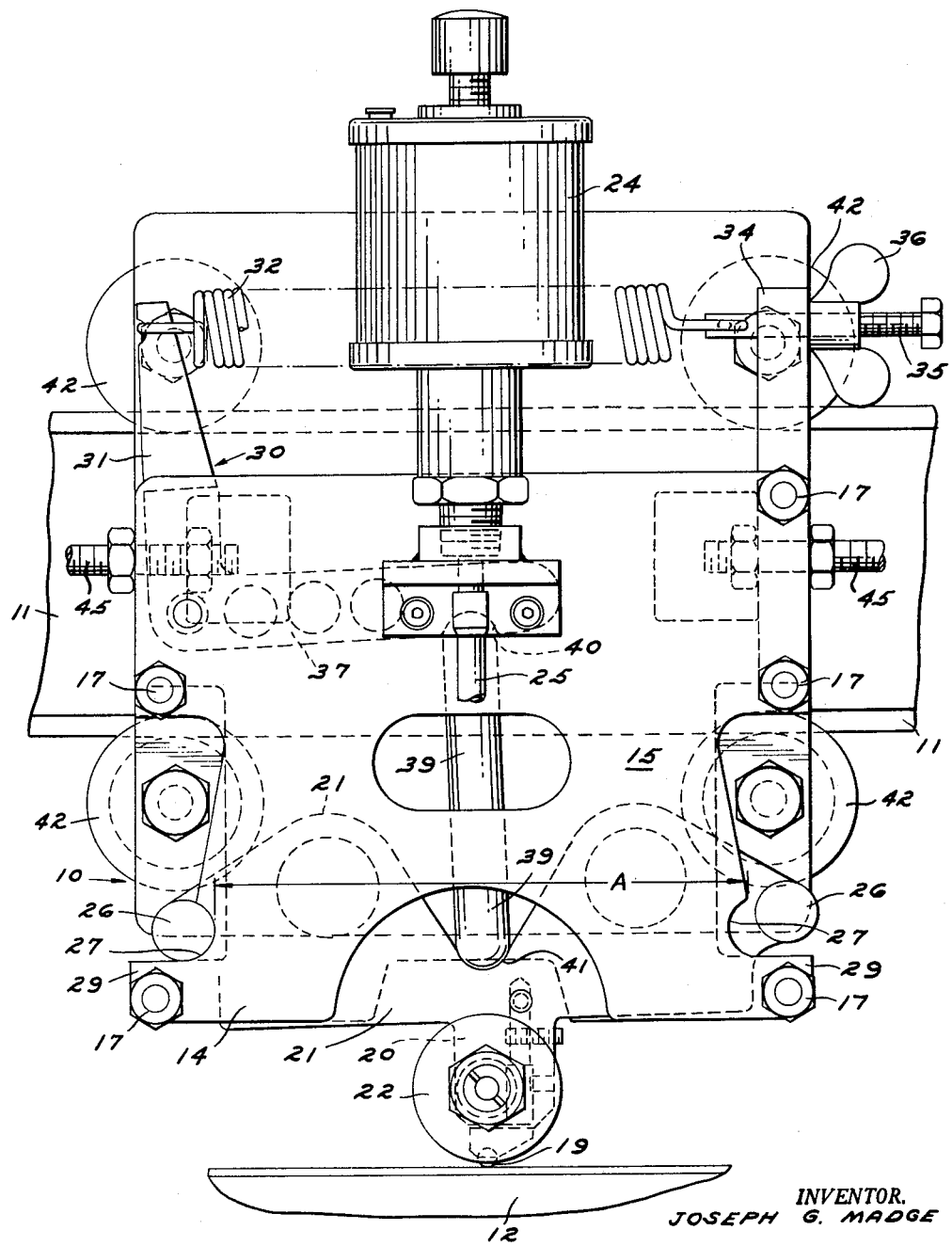

3,136,191
GLASS CUTTING HEAD
Joseph G. Madge, Dearborn, Mich., assignor to Ford Motor Company, Dearborn, Mich., a corporation of Delaware
Filed Feb. 15, 1961, Ser. No. 89,417
6 Claims. (Cl. 83—12)

This invention relates to glass cutting heads.

In making long, straight cuts across a piece of glass, the cutting wheel usually is mounted in a cutting head that is moved along rails to guide the head along a straight, predetermined path. The cutting wheel often is carried by a resiliently mounted lever to urge the cutting wheel against the glass with a more or less uniform pressure.

It is desirable to mount the cutting wheel on the supporting arm or lever in trailing relation to the pivot of the lever to obtain the maximum leverage between the pivot and the resultant vector of the pressure and the drag acting on the cutting wheel, the pivot always being in advance of the cutting wheel. In two-way cutters, it is usual to provide a pair of cutting wheels mounted on levers selectively moved into operating position, one wheel and lever being used for cutting in one direction and the other set being used for cutting in the reverse direction.

According to the present invention, a single cutting wheel is carried by a floating lever that is shifted by the cutting forces acting on the cutter to provide a pivot for the lever in the cutting head in advance of the cutting wheel regardless of the direction in which the cutting head is being moved.

Among the objects of the present invention are to provide a simplified two-way glass cutting head utilizing a single cutter and supporting lever; to provide such a cutting head in which the pivot of the lever is shifted automatically upon reversing the direction of the cut by the action of the cutting forces acting on the cutter; and to provide such a device that is economical to manufacture and simple and dependable in use. Other objects and objects relating to details of manufacture and use will be more apparent from the detailed description to follow.

My invention is clearly defined in the appended claims. In the claims, as well as in the description, parts may at times be identified by specific names for clarity and convenience, but such nomenclature is to be understood as having the broadest meaning consistent with the context and with the concept of my invention as distinguished from the pertinent prior art. The best form in which I have contemplated applying my invention is illustrated in the accompanying drawings forming part of this specification, in which:

FIGURE 1 is a side elevation of a glass cutting head constructed according to the present invention, portions of the cutting head supporting rail and of the lubricant feed being broken away for convenience of illustration.

FIGURE 2 is an end elevation, at reduced scale, of the cutting head shown in FIGURE 1.

FIGURE 3 is a rear side elevation, at reduced scale, of the cutting head shown in FIGURE 1.

Referring now to the drawings, the cutting head 10 of the present invention is adapted to be moved along a straight rail 11, which preferably extends horizontally above a glass cutting table 12. The cutting head 10 comprises a frame 14, which preferably is comprised of two spaced parallel side plates 15 and 16 which may be secured together by a series of bolts 17.

A glass cutter 19, which may be of the conventional rotating wheel type, is supported within a cutter mounting 20 which in turn is secured to a cutter supporting lever 21 carried by the frame 14 and preferably received between the side plates 15 and 16 of the frame. The cutter 19 and the cutter mounting 20 project downwardly from the cutting head as indicated in the drawings. If desired, a climbing roll 22 may be journalled on the cutter mounting 20 beside the cutter 19 for raising the cutter sufficiently to permit it to ride over the edge of a sheet of glass when commencing the cut. A cutting fluid reservoir 24 of the usual type may be mounted on the frame 14 for feeding lubricant to the cutter 19 through a flexible tube 25.

The cutter supporting lever 21 has a floating mounting within the frame 14, being capable of moving a short distance vertically and a short distance from side to side as viewed in FIGURE 1. The lever 21 and the frame 14 are provided with cooperating portions at each end of the lever for forming a pivotal connection of the lever in the frame at both ends of the lever, only one of the pivotal connections being operable at a time. The pivotal connections between the lever 21 and frame 14 are established by lateral movement of the lever within the frame, caused by drag of the cutter 19 on the glass in commencing a cut, as will be explained in more detail. The drag or force exerted on the cutter 19 will move the lever 21 in a direction to establish a pivotal connection between the lever and the frame 14 on the advance or leading side of the cutter, the trailing end of the lever in each instance being free to rise and fall a limited amount within the frame 14.

In the form of the invention shown in the drawings, the pivotal connection between the frame 14 and the lever 21 consists of a roller 26 projecting laterally on at least one side from both ends of the lever. The rollers 26, 26 are received within arcuate notches 27, 27 formed in the lower portion of the side plate 15. The distance A from the base of one of the notches 27 to the upper end of the other notch 27 is slightly less than the distance between the rollers (see FIGURE 1) so that one or the other of the rollers 26 of the loader will be pivotally engaged with the cooperative notch 27 of the frame, depending on which direction the cutter is being operated, the other end of the loader being free to rise and fall within the frame 14. As will be apparent from the study of FIGURE 1, the drag on the cutter 19 on the lever 21 will always tend to move the lever within the frame 14 to pivotally engage the leading end of the lever with the frame. Projections 29, 29, located immediately below the arcuate notches 27, 27 of the side plates 15 and 16 serve to retain the lever 21 within the frame 14.

The cutter supporting lever 21 is biased downwardly within the frame 14 at all times by a linkage which may consist of a bell crank lever 30 extending between the side plates 15 and 16 of the frame. An upwardly projecting leg 31 of the lever receives an end of a conventional tension spring 32, the other end of the spring 32 being anchored to an abutment 34 secured to the frame 14. A screw 35 and cooperating thumb screw permit adjustment of the tension of spring 32, the spring biasing the bell crank lever 30 clockwise as viewed in FIGURE 1.

A generally horizontally extending leg 37 of the bell crank lever 30 terminates above the midportion of the cutter supporting lever 21 and a strut 39 extending between the side plates 15 and 16 of the frame is received within sockets 40 and 41 in the bell crank lever and the cutter supporting lever respectively. The strut 39 extends substantially vertically within the frame 14, the lower end of the strut moving from side to side with the cutter supporting lever 21 and being inclined in either direction at a slight angle to the vertical. The spring 32 may be adjusted to give the desired cutting pressure on the cutter 19 and the linkage including the bell crank lever 30 and strut 39 will serve to give a uniform cutting pressure when cutting in either direction.

The cutting head 10 is mounted for movement along the rail 11 by four grooved rollers 42 journalled on a backing plate 44 secured to the side plate 16 of the frame (see FIGURE 2). The cutting head may be moved along the rail 11 by chains, not shown, which may be attached to the two sides of the cutting head by bolts 45 secured to the backing plate 44 in the manner shown in FIGURE 3.

I claim:

1. A two-way glass cutting head, comprising: a frame adapted for movement in two generally opposite directions and having a pair of spaced, parallel plate portions, a cutter supporting lever mounted for floating movement between the spaced portions of the frame, a cutter projecting from the midportion of said lever, and means biasing said lever in a direction to project the lever and cutter from the head, the lever having a projecting pivot element at each end thereof and the frame having an outwardly opening concave portion adjacent each end of the lever to form a pivotal connection of each end of the lever in the frame, the spacing between the pivot elements of the lever being slightly greater than the spacing between the concave bearing portions of the frame, whereby the drag of the cutter on a sheet of glass will move the lever rearwardly in the frame to form a pivotal connection of the end of the lever at the leading side of the cutter, the end of the lever at the trailing side of the cutter being free to move within the frame.

2. A two-way glass cutting head, comprising: a frame adapted for movement in two generally opposite directions and having a pair of spaced, parallel plate portions, a cutter supporting lever mounted for floating movement between the spaced portions of the frame, a cutter projecting from the midportion of said lever, a strut pivotally engaging the midportion of the lever, extending generally perpendicular to the lever, and biased in a direction to project the lever and cutter from the head, the lever having a projecting pivot element at each end thereof and the frame having an outwardly opening concave portion adjacent each end of the lever to form a pivotal connection of each end of the lever in the frame, the spacing between the pivot elements of the lever being slightly greater than the spacing between the concave bearing portions of the frame, whereby the drag of the cutter on a sheet of glass will move the lever rearwardly in the frame to form a pivotal connection of the end of the lever at the leading side of the cutter, the end of the lever at the trailing side of the cutter being free to move within the frame.

3. A two-way glass cutting head, comprising: a frame adapted for movement in two generally opposite directions and having a pair of spaced, parallel plate portions, a cutter supporting lever mounted for floating movement between the spaced portions of the frame, a cutter projecting from the midportion of said lever, a strut pivotally engaging the midportion of the lever, extending generally perpendicular to the lever, and biased in a direction to project the lever and cutter from the head, the lever having a laterally projecting pivot element at each end thereof and one of the plate portions of the frame having an outwardly opening concave portion adjacent each end of the lever to form a pivotal connection of each end of the lever in the frame, the spacing between the pivot elements of the lever being slightly greater than the spacing between the concave bearing portions of the frame, whereby the drag of the cutter on a sheet of glass will move the lever rearwardly in the frame to form a pivotal connection of the end of the lever at the leading side of the cutter, the end of the lever at the trailing side of the cutter being free to move within the frame.

4. A two-way glass cutting head, comprising: a frame adapted for movement in two generally opposite directions, a cutter, lever means mounted for limited floating movement in the frame, said cutter being carried by said lever means, a strut engaging the midportion of said lever means and extending generally perpendicular thereto, and means biasing said strut in a direction to project the lever means and cutter from the head, the said lever means and frame having cooperating portions at each end of the lever means to form a pair of alternative transverse pivotal connections of the lever means in the frame and the cooperating portions at the leading side of the cutter in either direction of movement of the frame being pivotally engaged by rearward displacement of the lever means due to the drag of the cutter on a sheet of glass.

5. A two-way glass cutting head, comprising: a frame adapted for movement in two generally opposite directions, a cutter, lever means mounted for limited floating movement in the frame, said cutter being mounted on the midportion of said lever means, and means biasing said lever means in a direction to project the cutter from the head, the lever means and frame having cooperating portions at each end of the lever means to form a pair of alternative transverse pivotal connections of the lever means in the frame and the cooperating portions at the leading side of the cutter in either direction of movement of the frame being pivotally engaged by rearward displacement of the lever means due to the drag of the cutter on a sheet of glass.

6. A two-way glass cutting head, comprising: a frame adapted for movement in two generally opposite directions, a cutter, lever means mounted for limited floating movement in the frame, said cutter being carried by said lever means, and means biasing said lever means in a direction to project the lever means and cutter from the head, the lever means and frame having cooperating portions at each end of the lever means to form a pair of alternative transverse pivotal connections of the lever means in the frame and the cooperating portions at the leading side of the cutter in either direction of movement of the frame being pivotally engaged by rearward displacement of the lever means due to the drag of the cutter on a sheet of glass.

References Cited in the file of this patent

UNITED STATES PATENTS

| | | |
|---|---|---|
| 2,319,103 | Allen | May 11, 1943 |
| 2,756,545 | Atkeson | July 31, 1956 |